United States Patent [19]
Lahoda et al.

[11] Patent Number: 5,361,514
[45] Date of Patent: * Nov. 8, 1994

[54] REMOVAL OF VOLATILE AND SEMI-VOLATILE CONTAMINANTS FROM SOLIDS USING THERMAL DESORPTION AND GAS TRANSPORT AT THE SOLIDS ENTRANCE

[75] Inventors: Edward J. Lahoda, Edgewood Borough; John A. Paffenbarger, Pittsburgh; C. Keith Paulson, Murrysville, all of Pa.; Jerry C. Seagle, Brandon, Fla.; Donald W. Cash, Murray, Utah

[73] Assignee: Westinghouse Electric Corporation, Pittsburgh, Pa.

[ * ] Notice: The portion of the term of this patent subsequent to Jul. 27, 2010 has been disclaimed.

[21] Appl. No.: 62,513

[22] Filed: May 14, 1993

Related U.S. Application Data

[63] Continuation-in-part of Ser. No. 785,397, Oct. 30, 1991, Pat. No. 5,230,167.

[51] Int. Cl.$^5$ ............................................. F26B 7/00
[52] U.S. Cl. ............................................. 34/391; 34/510; 34/216; 34/228; 34/500
[58] Field of Search ............... 34/28, 32, 73, 74, 75, 34/76, 79, 210, 216, 217, 218, 227, 228, 12, 13

[56] References Cited

U.S. PATENT DOCUMENTS

| | | | |
|---|---|---|---|
| 3,432,397 | 3/1969 | Berg | 34/39 |
| 3,954,069 | 5/1976 | Loken | 110/8 R |
| 4,050,900 | 9/1977 | Hobbs et al. | 23/277 R |
| 4,738,206 | 4/1988 | Noland | 110/346 |
| 4,756,092 | 6/1988 | Anderson | 34/39 |
| 4,782,625 | 11/1988 | Gerken et al. | 47/58 |
| 4,864,942 | 9/1989 | Fochtman et al. | 110/226 |
| 4,977,839 | 12/1990 | Fochtman et al. | 110/346 |
| 5,188,041 | 2/1993 | Noland et al. | 110/246 |

OTHER PUBLICATIONS

*Process Technology and Flowsheets*, McGraw-Hill, 1979, pp. 225-226.
*Contaminated Land Reclamation and Treatment*, Michael A. Smith ed., Plenum Press, 1985, pp. 37-90, "On-Site Processing of Contaminated Soil" by W. H. Rulkens.
EPA Applications Analysis Report, *Shirco Infrared Incineration System*, Jun. 1989, pp. 39-42.

*Primary Examiner*—Denise L. Gromada
*Attorney, Agent, or Firm*—Daniel P. Cillo

[57] ABSTRACT

The removal of organics and volatile metals from soils using thermal desorption comprises moving contaminated materials, positioned on a belt conveyor, through a chamber (32) under oxygen conditions, temperature conditions, and residence time effective to substantially avoid incineration of the contaminants, while volatilizing the contaminants and producing a processed material that is substantially decontaminated, where the volatilized contaminants are carried from the chamber (32) by a transport gas which is passed through a packed tower (70) where quench/scrubbing liquid flows countercurrent to gas flow, for producing a substantially cleaned gas and a contaminated liquid concentrate. The gas may be passed through a further gas cleaning system (86) prior to discharge into the atmosphere, while the liquid concentrate is passed through a water treatment system (90) for producing substantially cleaned water which may be passed through an air cooler (92) and recycled back to cool the processed material. Steam from moist contaminated material can be used as a cocurrent transfer gas.

23 Claims, 3 Drawing Sheets

REMOVAL OF VOLATILE AND SEMI-VOLATILE CONTAMINANTS FROM SOLIDS USING THERMAL DESORPTION AND GAS TRANSPORT AT THE SOLIDS ENTRANCE

This is a continuation-in-part of U.S. application Ser. No. 07/785,397, filed on Oct. 30, 1991 now U.S. Pat. No. 5,230,167.

BACKGROUND OF THE INVENTION

This invention relates to an apparatus and method for removing volatile and semi-volatile contaminants from solid materials and, more particularly, to an apparatus and method for thermal desorption of organics and volatile metals from soils to separate the contaminants from the soil.

The contamination of soils, sludges, ashes, and other solids by organics and heavy metals is a significant environmental problem. Due to the large volumes involved and expensive disposal costs for these solids, there is a need to reduce the volume of waste requiring disposal.

The contaminated soil may be treated by destruction of the contaminants, such as by incineration or by pyrolysis, or by separation of the contaminants from the soil, such as by thermal desorption. During incineration, the contaminants are heated under oxygen concentrations and residence time to a temperature effective to decompose the contaminants. During pyrolysis, the contaminants are heated in the absence of oxygen for a predetermined residence time to a temperature effective to decompose the contaminants. During thermal desorption, the contaminants are heated under oxygen concentrations and residence time to a temperature effective to avoid decomposition of the contaminants, thereby enabling the separation of the volatilized contaminants from the soil.

An example of thermal desorption of soil is disclosed in U.S. Pat. No. 5,230,167 (Lahoda et al.), entitled "Removal of Organics and Volatile Metals From Soils Using Thermal Desorption" and assigned to the assignee of the present invention. Contaminated material, positioned on a belt conveyor, is vaporized by heaters such as infrared or microwave heaters providing high heat transfer rates (5 to 10 cal./sec./cm$^2$), in a thermal desorption chamber. This is able to volatilize contaminants difficult to vaporize, and produce a substantially decontaminated processed material.

In another invention involving thermal desorption, U.S. Pat. No. 5,188,041 (Noland et al.) uses heated oil, water, or eutectic salts passing through rotating hollow shafts and screw conveyor type flights to transport and heat contaminated soil in a vapor stripper under sealed conditions. Such a process would have a low heat transfer rates and be effective primarily for highly volatile contaminants. Moisture and contaminants in the material are stripped and carried cocurrently with the material by separate, heated, non-oxidative transport gas fed into the stripper from an outside heater. The contaminants are then burned in a burner or thermal destructor before being wet scrubbed or passed through activated carbon and vented. The hopper transporting the highly volatile contaminated material is itself sealed. Rotating means, rather than a flat type conveyor, move the material through the vapor stripper, and the separate, non-oxidative, transport gas is introduced downstream from the contaminated material introduction, to prevent undue drying of the material and formation of a dry crust on its surface. Condensation inside the vapor stripping conveyor is specifically avoided, and the non-oxidative transport gas, externally introduced, is blown directly onto the top of the contaminated material, which may enhance the escape of volatiles.

Another example of thermal treatment of soil is disclosed in U.S. Pat. No. 4,738,206 (Noland). Contaminated soil is conveyed through a chamber by a screw conveyor with internally heated flights and vapor stripped at a temperature below the boiling temperatures of the contaminants. This approach, however, will result in the production of very large volumes of gas, which then must be treated for contaminant removal. U.S. Pat. No. 3,432,397 (Berg) discloses a method for heating a mass of solid particles to produce carbon residue and distillation products. Here, gas flows through the bed of solids to obtain the required heat transfer. U.S. Pat. No. 4,756,092 (Anderson) discloses a method for drying sludge by air injection during heating by a gas burning apparatus.

The EPA Applications Analysis Report, *Shirco Infrared Incineration System*, June 1989, pages 39–42, discloses utilizing infrared heating elements to heat material positioned on a conveyor belt, which results in desorption of the contaminants from the material within a primary chamber, followed by incineration of the desorbed contaminants in the primary chamber. If combustion of the desorbed contaminants is not complete within the primary chamber, then the residuals from the desorbed contaminants are incinerated in a secondary chamber, which may produce toxic combustion products.

Thermal desorption of soil is also disclosed in U.S. Pat. Nos. 4,977,839 (Fochtman et al.) and 4,864,942 (Fochtman et al.). Contaminated materials, which are placed in a rotary kiln, are subjected to a temperature effective to volatilize the contaminants, but below the incineration temperature, for a period of time sufficient to effect the desired degree of separation of contaminants. However, incineration is due to a combination of the presence of an oxidizing substance and the residence time of the material at a particular time, and is not due to the temperature at which the process occurs.

U.S. Pat. No. 4,782,625 (Gerken et al.) discloses volatilizing organic compounds in a rotating cylinder having plural flights for moving soil through the cylinder. The material drying means, filtering means, scrubbing means, and bed of activated carbon are individually mounted on the bed of trailers to facilitate transportation of the equipment. Another description of processes to treat contaminated soil using a rotary kiln can be found in *Contaminated Land Reclamation and Treatment*, Michael A. Smith ed., Plenum Press, pages 37–90, "On-Site Processing of Contaminated Soil" by W. H. Rulkens, 1985. Incineration, treatment with catalysts, and low temperature vaporization of contaminants are disclosed. In low temperature treatment of off-gas, Rulkens discloses the use of steam as a carrier gas, cyclone filtering, condensing, gas scrubbing, separation of gas from the resulting contaminated liquid, and filtering the gas through activated carbon before discharging the gas.

However, utilization of any rotating means, such as the rotary kiln, the rotating cylinder, or screw conveyor type flights has several disadvantages. Due to the tumbling of the material within the drum, which may cause portions of the material to progress through the drum at different rates, the residence time of the material within the rotating drum to effect the desired degree of separation is variable.

Another disadvantage to the utilization of the rotary kiln and the screw conveyor is the low heat transfer rates (about 0.2 to 1 cal./sec/cm$^2$) through the shell of the kiln or through the hollow flights of the screw, which limits the throughput of these processes. Also, the soil or debris final temperature is limited by the materials of construction of the kiln and screw conveyor because the flame temperature required to obtain the desired heat transfer through the material to volatilize the contaminants may cause damage to the kiln and screw conveyor, such as material fatigue and melting of the rotary kiln and screw conveyor. Utilization of a lower flow temperature requires much larger pieces of equipment or a reduction of capacity. Use of lower soil temperatures to volatilize the contaminants requires a longer residence time of the material within the thermal desorption unit, and may result in incomplete contaminant removal.

Another disadvantage to the utilization of a rotating drum is the production of dust within the drum due to the tumbling of the material, which makes it difficult to treat the off-gas, produces a large amount of contaminated waste and can lead to operational problems, such as pipe blockages.

Therefore, what is needed is an improved apparatus and method that separates difficultly vaporized contaminates from the contaminated material, that has an increased throughput, that does not produce additional toxic materials, and that efficiently cools the processed material without recontaminating such material.

SUMMARY OF THE INVENTION

Accordingly, the invention resides in a method for removing volatile and semi-volatile contaminants from contaminated material, characterized by the steps of: feeding contaminated material into a chamber, and moving the contaminated material on a flat type belt conveyor through the chamber from an inlet end of the chamber to a discharge end of the chamber; heating the contaminated material on the belt conveyor in the chamber, as the contaminated material moves through the chamber, to a temperature effective for volatilizing the contaminants and for producing a dry processed material that is substantially decontaminated; providing a transport gas at least at the point of entrance of the contaminated material in the chamber; flowing the transport gas above the contaminated material on the belt conveyor to carry volatilized contaminants from the chamber; maintaining the temperature, oxygen concentrations, and residence time effective to substantially avoid incineration of the contaminants; passing the transport gas containing the volatilized contaminants from one end of the chamber; passing the volatilized contaminants discharged from the chamber through a packed tower where quench/scrubbing liquid flows countercurrent to gas flow, to produce a gas stream and a liquid; cooling the processed material; and discharging the processed material from the chamber.

The method may further comprise cooling the processed material by condensation of steam by a closed loop of cold recirculating liquid and using moisture containing contaminated material which will itself generate steam as a cocurrent transport gas at the point of introduction of the contaminated material into chamber 20, preventing air from entering the chamber. The method may also comprise recycling at least a portion of the gas, recycling at least a portion of the water to cool the processed material, cleaning at least a portion of the scrubbed gas in a gas cleaning system, and treating the contaminated liquid condensate in a water treatment system.

The invention also resides in an apparatus for removing volatile and semi-volatile contaminants from contaminated materials characterized by having: a chamber having a contaminated material inlet end and a discharge end; a belt conveyor by which means contaminated material can move through the chamber from the material inlet end of the chamber to the discharge end of the chamber; at least one heater positioned within the chamber above the belt conveyor which can heat material positioned on the belt conveyor and volatilize the contaminants and produce a dry processed material; means for maintaining oxygen concentrations, temperature, and time conditions in the chamber to substantially avoid incineration of contaminates; means for passing volatilized contaminants in a flow of gas from the chamber; a packed tower for passing volatilized contaminants in a flow of gas countercurrent to a quench/scrubbing liquid; means to contact the processed material with water at a point after exit of gases to the packed tower, so that additional steam is formed; and means to cool the processed material.

The thermal desorption unit and process, utilizing a belt conveyor with heaters within the chamber, enables a large quantity of the contaminated material to be decontaminated in a small chamber with a short residence time. The use of a countercurrent packed tower allows off-gas temperature to be reduced and does not require fine atomization of quench water. The use of cocurrent flow of steam as the transport gas from the soil, that is, both steam and soil flowing in the same direction, greatly reduces energy input and increases output by taking less heat into the transport gas stream. The use of a closed cooling loop prevents recontamination of the processed material.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

DESCRIPTION OF THE PREFERRED EMBODIMENT

The invention described herein provides an apparatus and method for thermally desorbing contaminants from contaminated solid materials, thereby separating the volatile and semi-volatile contaminants from the solid materials, separating contaminants from transport gas, and closed loop condensation cooling of the cleaned material.

A thermal desorption unit, referred to generally as 10 in the Figures, is capable of evaporating water, volatile contaminants, such as PCB's (polychlorinated biphenyls), PCH's (petroleum hydrocarbons), and PCP's (pentachlorophenols), and additionally, semi-volatile metals or metallic compounds, such as antimony, lead, cadmium, zinc, or mercury which are difficult to separate in standard systems utilizing heating through a metallic tube or wall.

Figure 1:
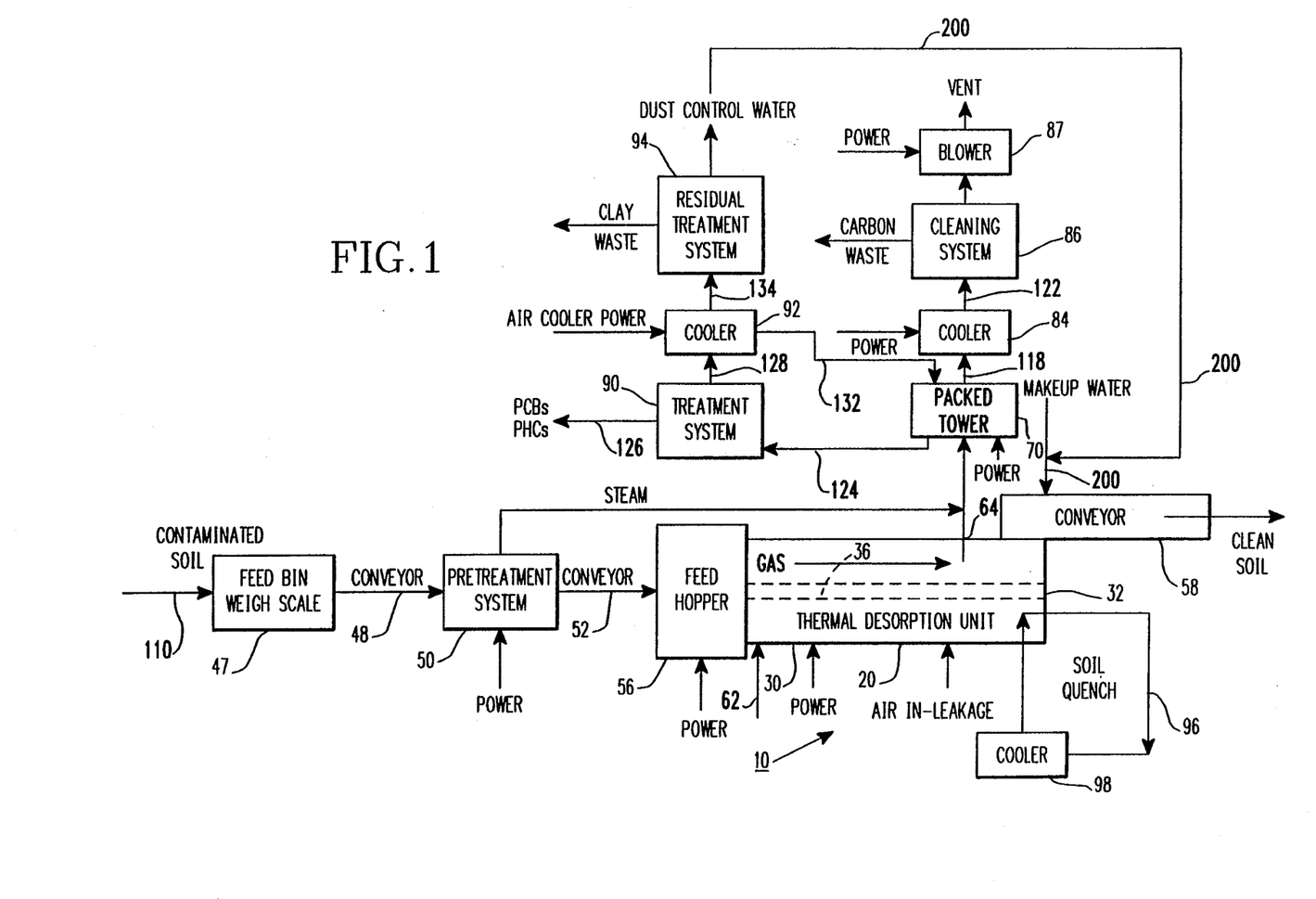
FIG. 1, which best illustrates the invention, is a schematic representation of a system for thermally desorbing contaminants from contaminated materials, also showing a packed tower and a closed loop recirculating soil quench.
Figure 2:
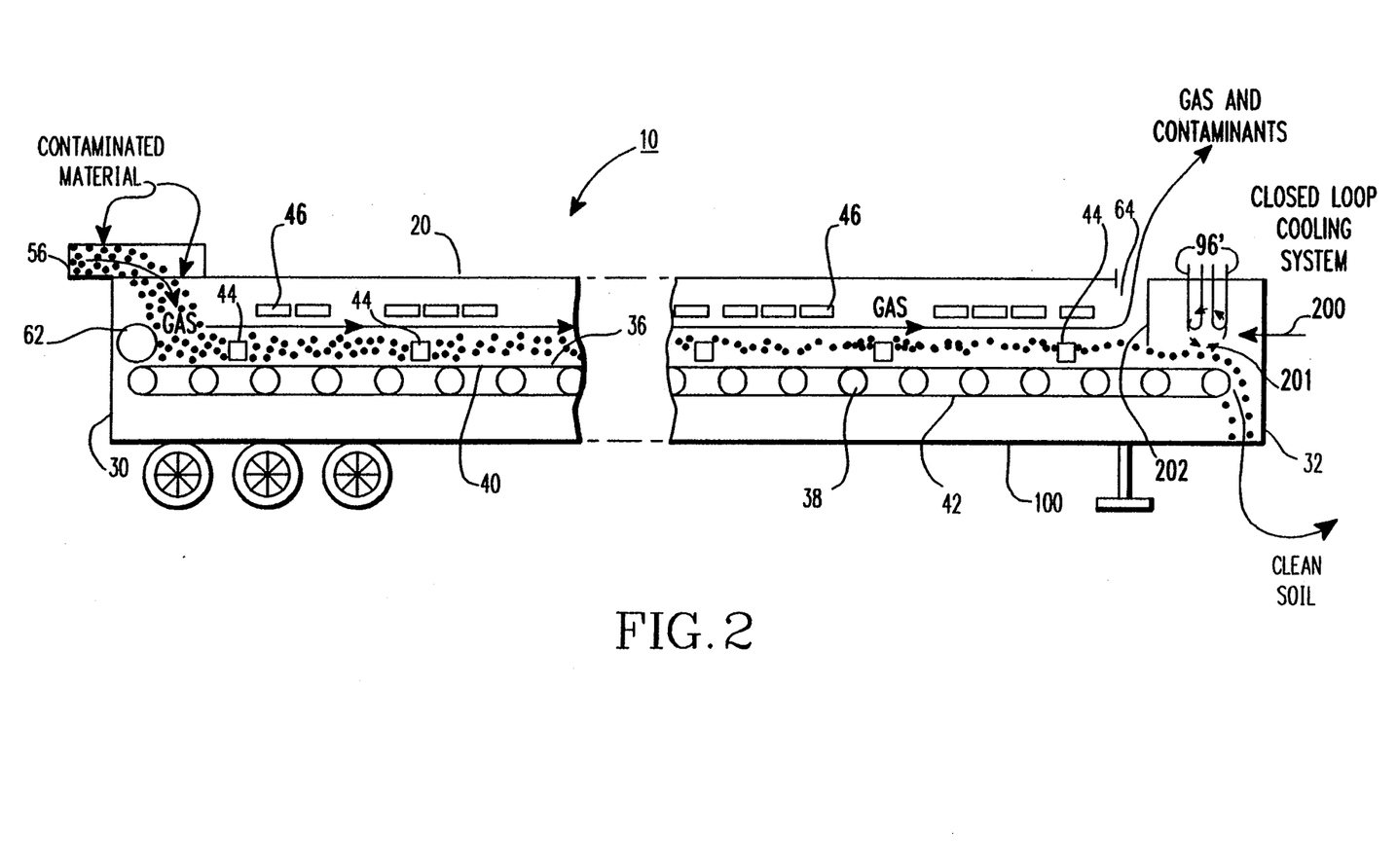
FIG. 2 is a schematic representation of a trailer, housing a thermal desorption unit having a conveyor belt and detailing the action of condensation of steam from a separate water input by the closed loop recirculating soil quench after the exit of the now-contaminated transport gas.

Referring specifically to FIGS. 1 and 2, the thermal desorption unit 10 includes a chamber 20. The chamber 20 is a housing, having a plurality of walls, which is substantially airtight. The chamber 20 has an inlet end 30 for receiving material into the chamber 20 and a discharge end 32. The chamber may be constructed of any of a multitude of materials and can be insulated or not. Preferably, the chamber 20 may be constructed of mild carbon steel and may be insulated with ceramic fiber. To protect the shell from corrosive volatiles, the interior steel surfaces can be sprayed with a corrosion resistant material before installing the insulation, and a stainless steel vapor barrier, which may include an additional layer of fiber insulation, may be positioned adjacent to the ceramic fiber.

The chamber 20 houses a "flat type" belt conveyor means 36, which may be constructed from a metal alloy, ceramic cloth, or the like, for transporting the contaminated material. This flat type conveyor may have sides to contain the contaminated material and will also include dished type belts. The belt conveyor 36, which is supported on rollers 38, has an upper belt portion 40 for moving the material from the inlet end 30 to the discharge end 32 of the chamber 20 and a lower belt portion 42 positioned below the upper belt portion 38. The belt conveyor does not rotate in any fashion. A rotary drier, such as a rotary kiln or rotating drum, cannot be substituted for the belt conveyor 36 due to the variable residence time of the material within the rotary drier, the limited heat transfer rates, the limited range of temperatures of the material, and the aeration of particulates within the volatilized contaminants.

Positioned within the chamber 20 are solid material mixers 44. The mixers 44 may be any mechanism, whether static or active, which breaks up the temperature profile of the solid material as it progresses along the belt conveyor 36, such as turning bars or chains positioned along the belt conveyor 36. The use of the mixers prevents formation of a crust over the top layer of solid material and speeds diffusion of heat throughout the solid material. An example of turning bars may be a bar with an array of attached teeth which slowly rakes through the material layer positioned on the belt conveyor 36 as the material moves through the chamber 20, for increasing contaminant removal. The plurality of turning bars may be positioned along the length of the belt conveyor 36 with the teeth positioned so that all of the material is turned as it moves along the length of the belt conveyor 36. The turning bars operate to gently turn the material to ensure that all of the contaminated materials are exposed to the heat, allowing the contaminants to be volatilized and the soil thoroughly dried, but do not entrain particulates into the space above the belt conveyor 36. If the thermal conductivity of the solid material is adequate, the mixers 44 may not be required.

The mixers 44 do not disturb the rate of movement of the material on the conveyor belt 36 as compared to a rotary kiln. A rotary action overturns the material creating the possibility of a portion of the material progressing through the chamber at a different rate than the rate of progress of another portion of the material progressing through the chamber. A consistent rate of movement of the contaminated material through the chamber 20 on the belt conveyor 36 enables a known residence time to be determined, as compared to the variable amount of time that a particular portion of material remains within a rotary kiln. By knowing the residence time needed for effective volatilization of a particular contaminant at a certain temperature, the length of time the material is held within the chamber 20 is minimized, thereby increasing the throughput of the material through the thermal desorption unit 10.

A plurality of heaters 46 are positioned above the contaminated material and belt conveyor 36 for heating the material as the material moves through the chamber 20 on the belt conveyor 36. The heaters 46 may be selected from the group consisting of infrared heaters, radio frequency heaters, microwave heaters, and the like type heaters. The utilization of these types of heaters in this invention provides very high heat transfer rates (5 to 10 cal./sec.cm$^2$) and allows very high temperatures to be obtained in the contaminated material, up to 800° C. (1472° F.), because heat transfer surfaces and their materials of construction are not a consideration, as in for example steam piping, or even hot oil piping which may only heat soil from about 316° C. (600° F.) to 371° C. (700° F.). Preferably, infrared heaters are utilized in this invention, thereby enabling the material to be indirectly heated by convection and conduction and directly heated by radiation.

Because the material moves through the chamber 20 at a constant rate and because the requisite temperatures can be obtained by utilization of the belt conveyor 36, the residence time of the contaminated material in the chamber 20 can be precisely controlled. The use of such types of heaters in the process completely dries the contaminated material to less than 1 weight % moisture, but such is not of any concern because the decontaminated soil is cooled by remoisturization after exit of the contaminated gas stream.

While low oxygen concentrations and residence time of the material within the chamber 20 are maintained, the heaters 46 are capable of heating the contaminated material to a temperature effective to volatilize even semi-volatile contaminants, without incinerating or pyrolyzing the contaminants. The heaters 46 heat the material to a temperature preferably between the range of 400° C. (752° F.) and 800° C. (1472° F.) for completely volatilizing semi-volatile contaminants from the solid material. Preferably, the material is heated to at least about 450° C. (850° F.) for a PCB contaminated material. The heaters 46 are connected to a control panel (not shown) for supplying and controlling electric power to the heaters 46.

The chamber 20 is substantially airtight for preventing air from entering the chamber 20. Reducing the quantity of air within the chamber 20, as by using transport gas from water present in the soil, reduces the possibility of volatilized contaminants leaking from the chamber 20 into the atmosphere. By preventing air from entering the chamber 20, there is a smaller volume of gas circulation within the chamber 20, which minimizes dust and particulate materials flowing above the belt conveyor 36, thereby simplifying the treatment of the contaminated off gases. Also, because the conditions necessary for incineration are a combination of the quantity of air, the temperature, and the residence time within the chamber 20, the minimization of air infiltration into the chamber 20 reduces the possibility of incineration of the contaminants, thereby minimizing the formation of highly toxic combustion products, such as dioxins and dibenzofurans, when removing chlorinated hydrocarbons such as PCB's.

A feed bin weigh scale 47 is used to determine the weight of the material travelling to the thermal desorption unit 10. A standard conveyor 48, which can be open, moves the material from the feed bin weigh scale 47 to a pretreatment system 50. A standard conveyor 52, which can be closed, transports the contaminated material from the pretreatment system 50 to a feeder 56, which is positioned adjacent to the inlet end 30 of the chamber 20. The feeder 56 may have a plurality of screw conveyors (not shown) rotatably mounted within an elongated housing, for moving the contaminated material into the chamber 20. The screw conveyors filled with the contaminated material act as a seal and prevent air from entering the chamber 20. A conveyor 58 positioned adjacent to the discharge end 32 of the chamber 20 removes the substantially decontaminated processed material from the chamber 20.

The chamber 20 has an optional gas inlet duct 62 which can be used for passing an additional flow of gas into the chamber 20. Additional gas inlet duct 62 is positioned at the inlet end 30 of the chamber 20 before or at the contaminated material entrance. Since the gas inlet duct 62 is positioned at the inlet end 30, the transport gas will preferably flow cocurrent with the movement of the contaminated material through the chamber 20 toward the exit end 32. A vacuum from the gas cleaning system draws the transport gas in the cocurrent direction. Besides steam from moisture in the contaminated material, additional transport gas selected from steam, $CO_2$, $N_2$, Ar, He their mixtures, or the like, can be fed through inlet 62. The transport gas will carry the volatilized contaminants from the chamber 20 via exit duct 64, which is before the optional cooling-moisture addition portion of the chamber. While FIG. 2 shows exit 64 at the very end of the chamber, and quench water from stream 200 forming steam in a separate section, there may be instances where there is no partition and steam formed at point 201 will flow for a period of time countercurrent to the material, to the exit which may be more in the middle of the chamber than shown in the Figure.

The gas will flow above the contaminated material positioned on the belt conveyor 36. By preventing the flow of gas through or into the contaminated soil, the presence of dust and fines above the belt conveyor 36 will be reduced, thereby decreasing the amount of contaminated solid waste produced by the process. The flow of the transport gas need only have a velocity sufficient to sweep the contaminants from the chamber 20, such as a velocity of approximately 0.2 ft/sec (0.06 m/sec) to approximately 2.5 ft/sec (0.75 m/sec). The transport gas fed through duct 62, if such is used, can have a temperature in the range of from 20° C. to 100° C.

Prior to the contaminated material entering the thermal desorption unit 10, the contaminated material may be pretreated, such as by sizing, sorting and removing branches and large plant stems. Pretreatment can also include moistening the contaminated material to promote complete desorption or by drying to reduce treatment costs, in the pretreatment system 50. The pretreatment depends on the moisture content of the contaminated material, such as soil, desorption characteristics of the material as determined by bench-scale tests, and the cost of operation of the pretreatment system. Typically, contaminated materials having 0 weight % to 8 weight % moisture may benefit from moistening, while those above 25 weight % moisture may be dried to reduce net operating costs and maintain good desorption performance.

Preferably, the contaminated material solids have from 5 weight % to 50 weight % moisture, most preferably, approximately 8 weight % to approximately 20 weight % moisture. With over 8 weight % moisture, as the contaminated material moves through the thermal desorption unit 10 along the belt conveyor 36, moisture is evaporated as steam, within the chamber 20, and helps to act or can act solely itself as the transport gas for carrying the volatilized contaminants from the chamber 20. This may eliminate some or all of the need of adding a transport gas into the chamber 20. Under 5 weight % moisture, much of the contaminated material will be dusty and there will be difficulty in handling the contaminated solids prior to desorption. Over 50 weight % moisture, contaminated material will be difficult to move through the unit, will increase treatment costs, and will also be difficult to handle in the pretreatment area, which may include screening and crushing operations.

Evaporated steam preferably flows cocurrent to the movement of the contaminated soil, and such steam flow would start at the entrance point of the contaminated soil due to the high heat transfer rate of the heaters used. Cocurrent flow is advantageous because it reduces the energy absorbed by the sweep gas. Since such steam from soil moisture may be used as the transport gas, it is very important to this invention that such steam start to be generated at the point of soil entrance into the chamber. By utilizing such evaporated steam from the soil there is a substantial material saving since substantially less or no additional transport gas is needed.

Referring to FIG. 1, the volatilized contaminants are passed from the chamber 20 to a gas treatment system which includes a quench/scrubbing system 70. The quench/scrubbing system 70 is positioned adjacent to the chamber 20, for condensing the gas exiting from the gas outlet duct 64 of the chamber 20 and for removing the contaminants from the gaseous phase into the liquid phase.

Gases leaving the quench/scrubber system 70 are substantially free of contaminants, but may still contain small amounts of entrained liquids. To remove the entrained liquids, the gas may be passed through a demister 82, or the like. The gas may be further cooled in a mechanical cooler 84. The gas is then passed through a cleaning system 86, such as a container with activated carbon, zeolite, or activated clays, which provides an additional organic contaminant removal step. The use of zeolite or activated clays are much preferred, and may eliminate the need for an in-line cooler, such as optional cooler 84. Also, zeolite and clay are non-combustible, can withstand high temperatures, and can hold large amounts of contaminants.

Figure 3:
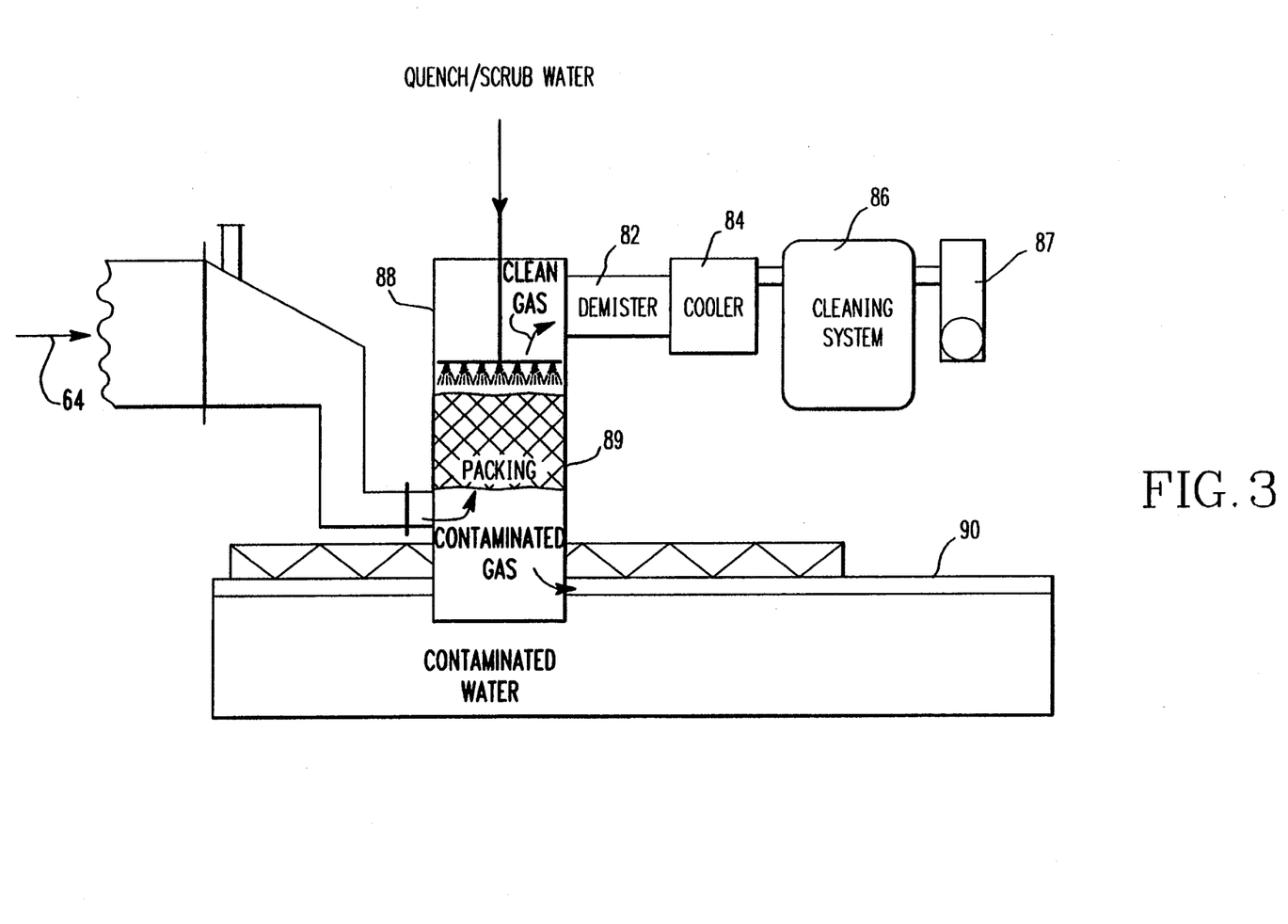
FIG. 3 is a schematic representation of a gas treatment packing tower, where quench/scrubbing liquid flows countercurrent to gas flow.

Referring to FIG. 3, the quench/scrubbing system 70 will include countercurrent operation through a packed tower 88, instead of cocurrent operation through spray quench followed by a venturi scrubber. The packed tower 88 uses conventional packing 89, such as rings, which are constructed of a material which is compatible with the temperatures and contaminants processed during thermal desorption, for example, metal, plastic, glass, ceramic or the like. When the gaseous stream contacts the packing, which has a large surface area, the contaminants condense and go into the liquid phase, instead of being entrained in the gas stream. Use of the packed tower, which employs countercurrent operation, allows a higher temperature liquid and a lower temperature gas to be discharged from the quench/scrubbing system 70, as compared to the use of cocurrent operation through a spray quench and a venturi scrubber, from which the discharge of gas and liquid have the same temperature.

The use of such a countercurrent operated packed tower is particularly advantageous and maximizes operating efficiency of the entire contaminated gas treatment steps. Because the temperature of the gas has been reduced, by the use of a packed tower, less cooling of the gas is required prior to discharge of the gas into the atmosphere. A packed tower causes a smaller pressure drop across the gas cleaning system, allows the off-gas temperature to be reduced because the quench/scrubbing liquid such as water flows countercurrent to the gas flow, and does not require fine atomization of the quench water. This reduces pumping horsepower and allows much better control of the pressure in the primary desorber since the pressure drop through the scrubbing unit is reduced.

The water or liquid removed from the quench/scrubber system 70 is passed to a water treatment system. The water treatment system includes a treatment system 90, such as an oil/water separator or immiscible liquids separator. The immiscible liquids separator separates the contaminants from the water phase by means of density differences. Two or three streams can leave the separator including a water fraction and one or two contaminant fractions. The contaminant fractions are heavier or lighter than water. The treatment system 90 removes contaminants, such as PCB, PHC, mercury, and solids fines. The contaminant fractions discharged from the treatment system 90 may be sent to drums or storage tanks for further processing. A portion of the treated water is passed through a heat exchanger 92 and recycled to the quench/scrubber system 70 via stream 132. The cooler 92 may comprise an indirect, water cooled spray tower or dry cooling system. A pH control system using caustic raises water pH after the air cooler 92. Also, raising the pH causes the organics to coagulate, enabling the organics to be separated as a separate phase. Acid may be added to the water after it is cooled to protect the activated carbon absorber.

A portion of the treated water is passed through a residual treatment system 94, which may include an activated carbon absorber, activated clay, ion exchange, precipitation and flocculation, for providing an additional treatment process for removing residual traces of organics or other contaminants from the water. The water passed through the residual treatment system 94 may be recycled as stream 200 and used for spraying water on the processed soil at the closed cooling loop near the cleaned soil exit of the chamber 20, to cool the soil, add moisture and control dust.

Preferably, a plurality of closed loop U tubes 96', filled with water or other suitable liquid is, used to cool the processed material as shown in FIG. 2. While such cooling means is shown inside the chamber in FIGS. 1 and 2, it can also be attached to the end of or outside the chamber 20. The closed loop may include at least one U tube 96', in which cooling liquid continuously flows therethrough. Water stream 200 that exits the residual treatment system 94 can be used to contact the processed material at point 201 as a separate water stream, to generate steam, which steam contacts the closed loop 96' and is condensed back to water droplets, transferring the heat from the soil to the water within the tubes 96 and further cooling the soil. Advantageously, because the cooling liquid remains in a closed loop, it does not become contaminated and does not require treatment prior to disposal. Also, use of water from the residual treatment system 94 as steam 200 eliminates the need to discharge contaminated water from the system, eliminating the need for additional permits.

A heat exchanger 98 cools the liquid within the tubes 96'. As shown in FIG. 2, preferably, a barrier 202 to transport gas which exits at opening 64, separates the contaminant volatilization stage or section of the desorption unit which occupies the major portion of chamber 20, from a processed material cooling stage or section containing closed cooling loops 96' and allows the water/steam/water cooling shown by the dotted arrows at point 201. Thus, transport steam is not condensed and so no contamination of the processed soil occurs.

A fraction of the water introduced in stream 200 remains in the processed material, so that the processed material can be returned to the environment with approximately the same moisture content as when it was fed into the system as contaminated material, since the processed soil, before cooling, will contain less than 1 weight % moisture. Also, a control system (not shown) houses the controls required to operate the subsystems of the thermal desorption process. A control cabinet (not shown) houses the system alarms, annunciators, recorder, process controllers, and process indicators.

As an example, the hourly throughput for the thermal desorption process is at least about 1 ton per hour (909 kilograms per hour) of contaminated material. An economic throughput of solid material is about 10 tons per hour. The thermal desorption unit 10 permits at a maximum approximately 20 tons per hour throughput of material. The residence time of the solid material, such as contaminated soil, in the chamber 20 of the thermal desorption unit 10 is within the range of approximately five minutes to 60 minutes. The effective flat type belt length exposed to the heaters 50 is approximately 50 feet and its width is approximately 7 feet.

Typical process conditions and other process specifications are as follows:

| | |
|---|---|
| Final soil temperature | 100° C. to 800° C. |
| Outlet gas temperature | 260° C. to 650° C. |
| Water temperature to scrubber | 38° C. to 93° C. |
| Water temperature from scrubber | 38° C. to 93° C. |
| Pressure within primary chamber | −0.063 cm. water to +1 cm |
| Sweep gas | steam, $CO_2$, $N_2$, Ar, He |
| Scrubber type | packed column |
| Liquids separation | oil/water separator tank |
| Treated soil cooling | water spray and cooling loop |
| Heaters | silicon carbide heating rods |

As an illustration, the estimated final PCB levels achievable utilizing the thermal desorption unit and process are approximately 1 ppm or less. To effectively remove PCB's, the contaminated material is heated to above approximately 450° C. (850° F.) with a residence time of approximately two to 20 minutes at approximately 450° C. As an example, approximately 10 tons/hr of soil contaminated with PCB's can be processed in the chamber 20 at a temperature of approximately 510° C. (950° F.) and a residence time of approximately 6 minutes. PCB's are used for illustration only. Organics, volatile metals, and their salts can also be removed.

The capacity of the thermal desorption system is dependent upon the characteristics of the feed material. The feed capacity is primarily determined by the contaminant desorption rates, the material specific heat, and the percent moisture of the feed. Other important variables are thermal conductivity of the bed, density of the material, and radiant absorptivity of the soil. The description and arrangement of several of the components utilized in the thermal desorption process, such as the heaters 50 and the belt conveyor 36, are described in U.S. Pat. No. 4,050,900.

Contaminated material may be transported from a contamination site to a permanent facility housing the thermal desorption unit 10. Alternatively, the thermal desorption unit 10 may be transported as a series of mobile units to the contamination site for on-site processing of the contaminated material. FIG. 2 shows one trailer of such a mobile unit.

OPERATION

Preparation equipment (not shown) processes the contaminated material to produce a feed stream with individual pieces smaller than 2.5 cm. Referring to FIGS. 1 and 2, after processing, the contaminated material is placed through stream 110 into the feed bin weight scale 47, which maintains a constant feed rate of contaminated material to chamber 20.

The use of the pretreatment system 50 is used to maintain from 8 weight % to 20 weight % moisture. If the contaminated material is conveyed from the feed bin weight scale 47 to the feeder 56 and into the chamber 20. The feeder 56 itself is open unless extremely volatile contaminants are being processed. The gas tightness of chamber 20 is maintained by use of screw conveyors into and out of chamber 20 as discussed previously. The heaters 50 within the chamber 20 will evaporate the water from the contaminated material prior to and cocurrent with thermally desorbing the contaminants. If the contaminated material is conveyed from the feed bin weight scale 47 to the pretreatment system 50 on conveyor 48, then the contaminated material is pretreated. The pretreatment may include evaporating the water from the contaminated material.

By removing the water prior to entry of the contaminated material into the chamber 20, less energy is needed to thermally desorb the contaminants from the material and the residence time of the contaminated material within the chamber 20 is reduced. Because the contaminated material may be a wet sludge, which may clog the screw conveyors of the feed hopper 56, by drying the contaminated material in a dryer prior to entry of the material into the chamber 20, the wet sludge is converted to separate fragments of material, which do not clog the feed hopper 56. Also, the dried material is more readily handleable than the wet sludge. Alternatively, and as previously described hereinabove, the pretreatment may include adding moisture to the contaminated material. The preferred moisture content is from 5 weight % to 20 weight % to allow evaporative transport gas use and reduce dusting during pre-treatment operation.

The contaminated material is conveyed to the feed hopper 56 on the feed conveyor 52. The contaminated material falls through the opening in the top of the chamber 20 and forms a ¼ to 2 inch layer across the width of the belt conveyor 36. The chamber 20 of the infrared thermal desorption unit 10 operates at a slight vacuum, for preventing the leakage of volatilized contaminants from the chamber 20 into the atmosphere. The contaminated material is heated by the heaters 50 as the material moves through the chamber 20 positioned on the belt conveyor 36. The material will be heated to a temperature effective to volatilize the contaminants from the soil, such as within the range of 100° C. to 800° C. A flow of gas can enter the chamber 20 through the gas inlet duct 62 to supplement steam from the soil and the volatilized contaminants will be transported above the belt conveyor 36. The gas and the volatilized contaminants exit the chamber 20 through the gas outlet duct and stream 64.

Referring to FIGS. 1 and 2, the vapor product off-gas including the gas and the volatilized contaminants passes through opening and stream 64 to the quench/scrubber system 70. The quench/scrubber system 70 will include a single piece of equipment, which both quenches and scrubs, such as packed tower 88. A gas stream and a contaminated liquid condensate will exit from the quench/scrubber system 70. The cleaned gas stream is drawn through stream 118 by the induced draft blower 87 from the quench/scrubber system 70. The cleaned gas stream passes to cooler 84 and then through stream 122 into the cleaning system 86 for an additional cleaning step prior to discharge into the atmosphere. The contaminated liquid condensate passes through stream 124 into the treatment system 90 for removal of contaminants and solid fines. The contaminants are passed through stream 126 and are removed from the site for further processing.

The decontaminated water passes through stream 128 into the cooler 92. A portion of the decontaminated water passes through stream 132 into the quench/scrubber system 70 for recycling the water. A portion of the decontaminated water is passed through stream 134 into the residual treatment system 94 for removing residual organics and metals. The clean solid material is cooled and moistened by spraying with water. An optional closed loop cooling loop within the chamber may condense some of the steam thereby produced. Clean, cooled soil drops off the end of the belt conveyor 36 and onto the conveyor 58, exiting the thermal desorption unit 10 through the discharge end 32 of the chamber 20. The soil is then returned to the environment.

The invention provides an apparatus and method for removing volatile contaminants from contaminated soil by thermal desorption, and utilizes smaller equipment, such as the gas cleaning system and the water treatment system, requires less maintenance, is easier to operate, and has a lower operating cost.

We claim:

1. A method for removing contaminants from volatile and non-volatile contaminated material, comprising the steps of:

(a) feeding contaminated material into a chamber, and moving the contaminated material on a flat type belt conveyor through the chamber from an inlet end of the chamber to a discharge end of the chamber;
(b) heating the contaminated material on the belt conveyor in the chamber, as the contaminated material moves through the chamber, to a temperature effective for volatilizing the contaminants and for producing a dry processed material that is substantially decontaminated;
(c) providing a transport gas at least at the point of entrance of the contaminated material into the chamber;
(d) flowing the transport gas above the contaminated material on the belt conveyor, to carry volatilized contaminants from the chamber;
(e) maintaining the temperature, oxygen concentrations, and residence time effective to substantially avoid incineration of the contaminants;
(f) passing the transport gas containing the volatilized contaminants from the chamber;
(g) passing the volatilized contaminants discharged from the chamber through a packed tower where a liquid flows countercurrent to gas flow, to produce a gas stream and a liquid;
(h) cooling the processed material;
(i) discharging the processed material from the chamber.

2. A method for removing contaminants from volatile and non-volatile contaminated material, comprising the steps of:
(a) passing contaminated material through a pretreatment system which adds moisture to the contaminated materials, or dries the contaminated material, so that the contaminated material has a moisture content of from 5 weight % to 50 weight %,
(b) feeding the pretreated contaminated material into a chamber, and moving the contaminated material on a flat type belt conveyor through the chamber from inlet end of the chamber to a discharge end of the chamber;
(c) heating the contaminated material on the belt conveyor in the chamber, as the contaminated material moves through the chamber, to a temperature effective for volatilizing the contaminates and for producing a dry processed material that is substantially decontaminated;
(d) providing a transport gas at least at the point of entrance of the contaminated material into the chamber;
(e) flowing the transport gas above the contaminated material on the belt conveyor, to carry volatilized contaminants from the chamber;
(f) maintaining the temperature, oxygen concentrations, and residence time effective to substantially avoid incineration of the contaminants;
(g) passing the transport gas containing the volatilized contaminants from the chamber;
(h) passing the volatilized contaminants discharged from the chamber through a packed tower where a liquid flows countercurrent to gas flow, to produce a gas stream and a liquid;
(i) cooling the processed material by condensation of steam by a closed loop of cold recirculating liquid;
(j) discharging the processed material from the chamber.

3. The method according to claim 2, where the contaminated material is heated between 400° C. and 800° C. by heaters selected from the group consisting of infrared heaters, radio frequency heaters and microwave heaters, positioned above the contaminated material in step (c), the gas stream of step (g) is passed through a cleaning system selected from the group consisting of activated clay and zeolite, and the dry processed material prior to cooling in step (i) has less than 1 weight % moisture.

4. The method of claim 2, where, in step (g), when the volatilized contaminants contact the packing in the packed tower, the contaminants condense and go into the liquid instead of being entrained in the gas stream.

5. The method of claim 2, where, in step (h), when the volatilized contaminants contact the packing in the packed tower, the contaminants condense and go into the liquid instead of being entrained in the gas stream.

6. A method for removing contaminants from volatile and non-volatile contaminated material, comprising the steps of:
(a) feeding contaminated material having a moisture content of from approximately 8 weight % to approximately 20 weight % into a chamber, and moving the contaminated material on a flat type belt conveyor through the chamber from an inlet end of the chamber to a discharge end of the chamber;
(b) heating the contaminated material on the belt conveyor in the chamber, as the contaminated material moves through the chamber, to a temperature effective for volatilizing the contaminates and for producing a dry processed material that is substantially decontaminated, where steam is generated from the contaminated material at the point of entrance of the contaminated material, which steam flows as sole transport gas cocurrent to the movement of the contaminated material through the chamber;
(c) flowing the steam transport gas above the contaminated material on the belt conveyor, to carry volatilized contaminates from the chamber;
(d) maintaining the temperature, oxygen concentrations, and residence time effective to substantially avoid incineration of the contaminants;
(e) passing the transport gas containing the volatilized contaminants from the chamber;
(f) passing the volatilized contaminants discharged from the chamber through a packed tower where a liquid flows countercurrent to gas flow, to produce a gas stream and a liquid;
(g) cooling the processed material;
(h) discharging the processed material from the chamber.

7. The method of claim 6, where an aqueous stream separated from the contaminated transport gas contacts the processed material in step (g) within the chamber but, after exit of the contaminated transport gas, to generate additional steam, which steam contacts a closed loop of cold recirculating liquid, condenses to add moisture to the processed material and further cools the processed material.

8. The method of claim 7, where the liquid produced in step (f) is treated and then used as the aqueous stream in step (g) to contact the processed material, so that no liquid need be discharged outside the system.

9. The method according to claim 6, where soil mixers are used in step (a) to ensure that all the contaminants are exposed to the heat and to prevent a dry crust from forming on the top of the contaminated material.

10. The method according to claim 9, where the soil mixers are turning bars with an array of teeth.

11. The method according to claim 6, where additional transport gas, selected from the group consisting of steam, $N_2$, $CO_2$, Ar, He and mixtures thereof is passed onto the chamber.

12. The method of claim 6, where, in step (f), when the volatilized contaminants contact the packing in the packed tower, the contaminants condense and go into the liquid instead of being entrained in the gas stream.

13. A method for removing contaminants from contaminated material, comprising the steps of:
    (a) feeding contaminated material having a moisture content of from 5 weight % to 50 weight %, into a chamber, and moving the contaminated material on a flat type belt conveyor through the chamber from an inlet end of the chamber to a discharge end of the chamber;
    (b) heating the contaminated material on the belt conveyor in the chamber, as the contaminated material moves through the chamber, to a temperature effective for generating steam from the moisture in the contaminated material starting at the point of entrance of the contaminated material into the chamber, and for volatilizing the contaminants and for producing a dry processed material that is substantially decontaminated;
    (c) passing the generated steam as sole transport gas above the contaminated material on the belt conveyor and cocurrent to the movement of the contaminated material through the chamber, to carry volatilized contaminants from the chamber;
    (d) passing the transport gas containing the volatilized contaminants from the chamber;
    (e) cooling the processed material; and
    (f) discharging the processed material from the chamber through the discharge end of the chamber.

14. The method of claim 13, where the processed material is cooled by condensation of steam by a closed loop of cold recirculating liquid, where an aqueous stream separated from the contaminated transport gas contacts the processed material in step (e) to generate additional steam, after the exit of the contaminated transport gas, which steam contacts the closed loop of cold recirculating liquid, condenses to add moisture to the processed material and further cools the processed material.

15. The method of claim 13, where the contaminated material is heated between 400° C. and 800° C. by heaters selected from the group consisting of infrared heaters, radio frequency heaters and microwave heaters, positioned above the contaminated material in step (b), and the processed material prior to cooling in step (e) has less than 1 weight % moisture.

16. The method of claim 13, where additional gas, selected from the group consisting of steam, $N_2$, $CO_2$, Ar, He and mixtures thereof is used as additional transport gas.

17. The method of claim 13, where liquid produced in step (f) is treated and then used as the aqueous stream in step (e) to contact the processed material, so that no liquid need be discharged outside the system, and where the volatilized contaminants of step (c) are passed through a packed tower where a liquid flows countercurrent to gas flow, to produce a gas stream and a liquid.

18. An apparatus for removing volatile and semi-volatile contaminants from contaminated materials, comprising:
    (a) a chamber having a contaminated material inlet end and a discharge end;
    (b) a belt conveyor by which means contaminated material can move through the chamber from the material inlet end of the chamber to the discharge end of the chamber;
    (c) at least one heater positioned within the chamber above the belt conveyor which can heat material positioned on the belt conveyor and volatilize the contaminants and produce a dry processed material;
    (d) means for maintaining oxygen concentrations, temperature, and time conditions in the chamber to substantially avoid incineration of contaminates;
    (e) means for passing volatilized contaminants in a flow of gas from the chamber;
    (f) a packed tower with means for passing volatilized contaminants in a flow of gas countercurrent to a liquid;
    (g) means to contact the processed material with water at a point after exit of gases to the packed tower, so that additional steam is formed; and
    (h) means to cool the processed material.

19. The apparatus according to claim 18, wherein the means for passing volatilized contaminants from the chamber includes a means to provide a transport gas at least at the contaminated material inlet.

20. The apparatus according to claim 18, wherein the means to contact the processed material with water is at a point within the chamber, the means to cool the processed material also adds moisture, where the cooling is by condensation of additional steam by a closed loop of cold recirculating liquid before discharge, and the heaters are selected from the group consisting of infrared heaters, radio frequency heaters, and microwave heaters positioned above the belt conveyor and capable of heating contaminated material between 400° C. and 800° C.

21. The apparatus according to claim 18, wherein the heaters are positioned to volatilize steam from steam contaminated material starting at the material inlet.

22. The apparatus according to claim 18, wherein a gas cleaning system is positioned adjacent to the packed tower, and where a water treatment system is positioned adjacent the packed tower and water from such system has a recirculation means back to the processed material so that no water need be discharged from the apparatus.

23. The apparatus according to claim 18, as a series of mobile units.

* * * * *